(12) United States Patent
Kazama et al.

(10) Patent No.: US 8,876,658 B2
(45) Date of Patent: Nov. 4, 2014

(54) CONTROL APPARATUS FOR PREVENTING ROLLING BACK OF AN ELECTRICALLY DRIVEN VEHICLE UPON START-UP THEREOF

(75) Inventors: Isamu Kazama, Odawara (JP); Shinsuke Nakazawa, Yokohama (JP); Futoshi Yoshimura, Hadano (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 59 days.

(21) Appl. No.: 13/825,863

(22) PCT Filed: Sep. 26, 2011

(86) PCT No.: PCT/JP2011/071837
§ 371 (c)(1),
(2), (4) Date: Mar. 25, 2013

(87) PCT Pub. No.: WO2012/063564
PCT Pub. Date: May 18, 2012

(65) Prior Publication Data
US 2013/0178332 A1 Jul. 11, 2013

(30) Foreign Application Priority Data

Nov. 8, 2010 (JP) .................. 2010-249341

(51) Int. Cl.
*B60W 10/08* (2006.01)
(52) U.S. Cl.
USPC .............. 477/27; 477/4; 701/22; 180/65.285
(58) Field of Classification Search
USPC ......... 477/4, 21, 27; 701/22; 180/282, 65.285
See application file for complete search history.

(56) References Cited

U.S. PATENT DOCUMENTS

| 6,321,144 | B1 * | 11/2001 | Crombez | 701/22 |
| 2002/0116101 | A1 * | 8/2002 | Hashiba et al. | 701/22 |
| 2003/0132664 | A1 * | 7/2003 | Grand et al. | 303/20 |
| 2005/0143877 | A1 * | 6/2005 | Cikanek et al. | 701/22 |
| 2009/0299557 | A1 * | 12/2009 | Farnsworth | 701/22 |

FOREIGN PATENT DOCUMENTS

| JP | 08-033114 A | 2/1996 |
| JP | 10-271605 A | 10/1998 |
| JP | 2000-270404 A | 9/2000 |

(Continued)

OTHER PUBLICATIONS

English translation of JP2008193772A (from IDS); http://translationportal.epo.org; Jul. 16, 2014.*

*Primary Examiner* — Roger Pang
(74) *Attorney, Agent, or Firm* — Young Basile

(57) ABSTRACT

In an electrically driven vehicle propelled by an electric machine (motor)equipped with a collaborative braking system of regenerative and frictional braking capacities, in order to achieve the "rollback prevention" at starting on an sloping road, when the regenerative braking is not available due to charging restriction to battery, frictional braking is used instead of regenerative braking and wheels are (automatically, i.e. not manually by driver) braked with friction to prevent the rollback. Moreover, in addition to braking wheels by frictional braking, further control is performed to adjust and match the magnitude of frictional braking force to a braking force in accordance with the starting operation. Thus, at the time of rollback prevention by the frictional braking as well, the similar prevention of rollback will be possible as the prevention by way of regenerative braking such that the effect of rollback prevention may be achieved without a feel of discomfort.

7 Claims, 10 Drawing Sheets

(56) References Cited

FOREIGN PATENT DOCUMENTS

| | | |
|---|---|---|
| JP | 2004-215447 A | 7/2004 |
| JP | 2007-203975 A | 8/2007 |
| JP | 2007-259611 A | 10/2007 |
| JP | 2008-092683 A | 4/2008 |
| JP | 2008-154324 A | 7/2008 |
| JP | 2008-193772 A | 8/2008 |
| JP | 2009-162291 A | 7/2009 |

* cited by examiner

3 Motor
4 Resuction unit
5 Motor controller
6 Battery
7 Inverter
8 Unified controller
13

13 Brake fluid pressure control unit
14 Fluid pressure brake controller
21 Brake pedal stroke sensot
22 Shifter
23 Accelerator opening sensor (Brake fluid pressure control) START SB-01 Input parameters detection & calculation (brake pedal stroke BRKSTRK)

SB-02 Calculate brake pedal depression determination flag, flag_BRK

SB-03 Transmission process of date (flag_BRK)

SB-04 Calculate brake fluid pressure basic value TPMC0

SB-05 Receiving process of date (TTBRK)

SB-06 Calculte brake fluid pressure command value TPMC

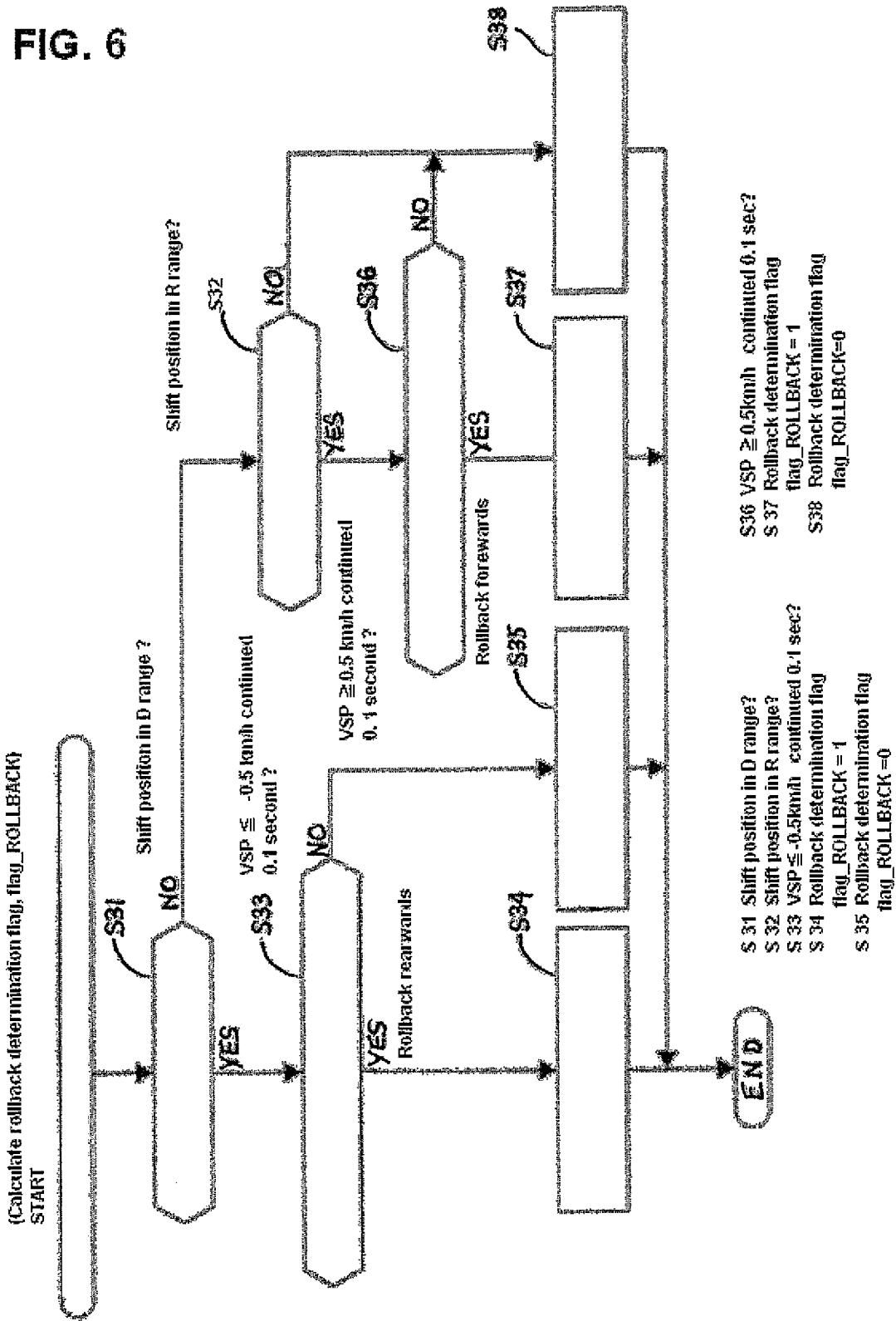

FIG. 7

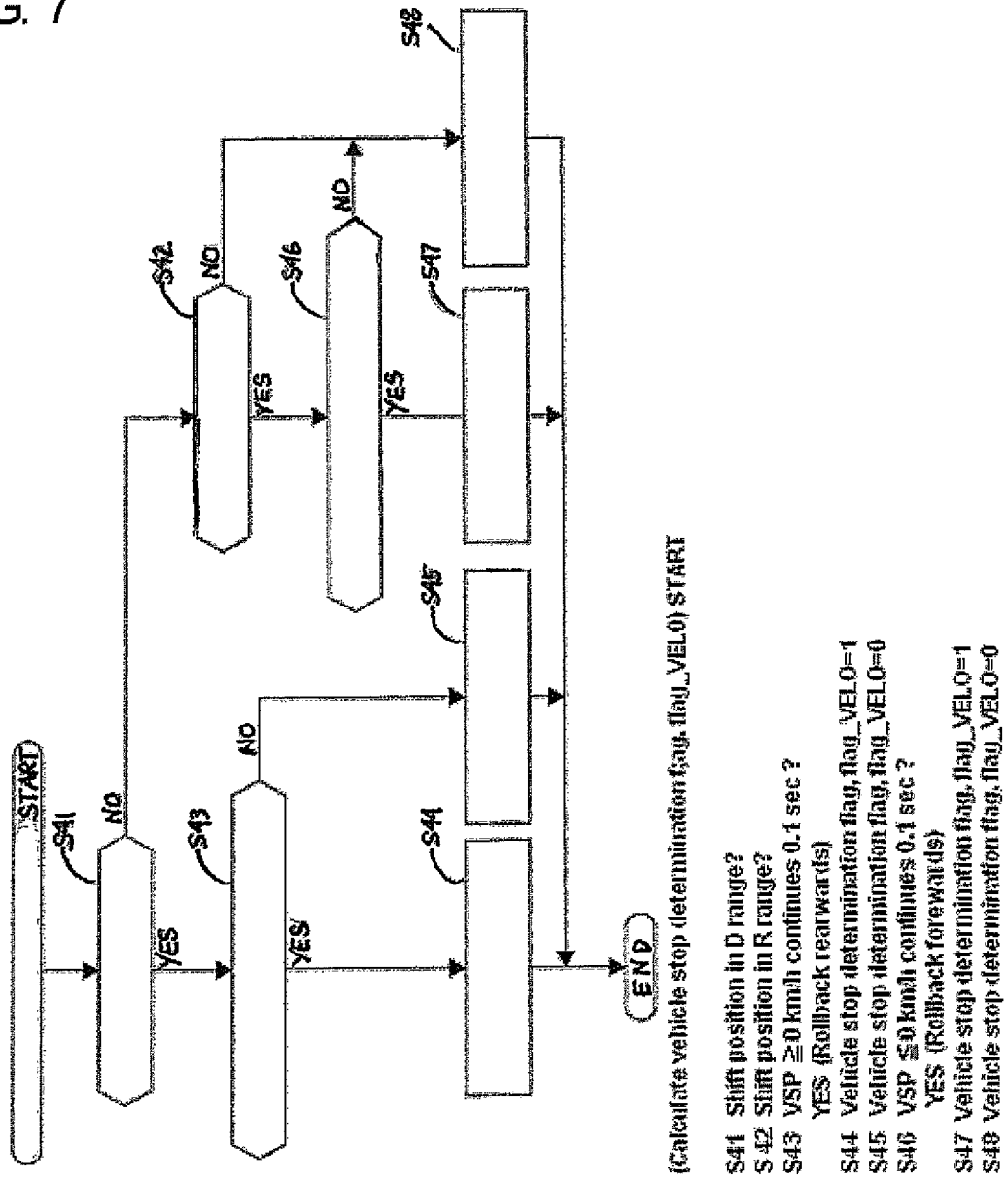

(Calculate vehicle stop determination flag, flag_VEL0) START

S41 Shift position in D range?
S42 Shift position in R range?
S43 VSP ≧0 km/h continues 0.1 sec ?
    YES (Rollback rearward)
S44 Vehicle stop determination flag, flag_VEL0=1
S45 Vehicle stop determination flag, flag_VEL0=0
S46 VSP ≦0 km/h continues 0.1 sec ?
    YES (Rollback forewards)
S47 Vehicle stop determination flag, flag_VEL0=1
S48 Vehicle stop determination flag, flag_VEL0=0

CONTROL APPARATUS FOR PREVENTING ROLLING BACK OF AN ELECTRICALLY DRIVEN VEHICLE UPON START-UP THEREOF

TECHNICAL FIELD

The present invention relates to an electrically driven vehicle such as an electric vehicle using an electric motor only as power source or a hybrid vehicle using energy from both an engine and electric motor for travelling.

In particular, the present invention relates to a rollback prevention technology at starting of an electrically driven vehicle that is prevented from rolling back in the direction opposite to the starting direction when the electric vehicle starts moving forward or backward, such as on uphill, due to a road gradient and the like.

BACKGROUND

The electrically driven vehicle is capable of traveling by conveying the driving force of a motor/generator to wheels, and is further capable of braking the wheels by a cooperative control between regenerative braking due to an electric generation associated load of a motor/generator and friction braking due to the hydraulic brake unit when required. The electric power that is generated by the motor/generator is stored or charged in a battery for use as electric power during motor drive.

Incidentally, when performing brake operations on the wheels by the cooperation between the regenerative braking and frictional braking, in the conventional cooperation braking system, in general, a priority is given to the regenerative braking in terms of an energy recovery rate, and when braking the wheels by just regenerative braking is insufficient to achieve the target braking torque required by the driver, the shortage will be compensated for by the friction braking.

Therefore, when attempting to start the electrically driven vehicle on such as uphill road by releasing a brake pedal and depressing on an accelerator pedal, the vehicle may rolls back in the direction opposite to the start up or starting direction due to the road gradient. To control and prevent this rollback at start up, as described in Japanese Laid-Open Patent Application Publication No. 2007-203975, for example, the wheels will be braked via regenerative braking to prevent the vehicle rollback.

However, if the power source battery is in a fully charged or a nearly fully charged state, or the battery is restricted to be charged at extremely low temperature, the motor/generator is prevented from generating electricity for performing the regenerative braking at the wheels.

In this case, the motor/generator cannot output the driving force by being operable as a generator, the electrically driven vehicle rolls back continuously in the reverse direction of the desired direction of the driver despite trying to start the vehicle by depression of the accelerator pedal after the release of the brake pedal, there arises a problem of giving a sense of discomfort to the driver.

BRIEF SUMMARY

The present invention is intended to provide a rollback prevention control device of the electrically driven vehicle at starting of the wheels instead of the regenerative braking, and thereby solving the above stated problem, and to prevent the rollback of the electrically driven vehicle by a frictional braking in a situation that the electrically driven vehicle would roll back because of lack of regenerative braking force due to change restriction.

For this purpose, the control device for prevention of rollback of the vehicle at starting up according to the present invention is configured in the following manner. First, description is made of the electrically driven vehicle to which the present invention is assumed to be applied.

The vehicle is capable of traveling by transmitting driving force from a rotation electric machine to wheels, and the wheels are capable of being braked by regenerative braking by the load associated with electricity generation by the electric machine and a frictional braking on as required basis The electrically driven vehicle with such prevention control device according to the present invention at start up is characterized by the provision of a charging limiting or restriction detecting unit, starting operation detecting unit, vehicle rollback detecting unit, and frictional braking control unit.

The charging limiting detecting unit that detects charging to the rotation electric machine is being restricted, and the starting operation detecting units detects the starting operation of the driver. The vehicle rollback detecting unit detects that the vehicle rolls backward in the direction opposite to the starting direction when the starting detecting unit has detected the starting operation.

The frictional braking control unit causes the above described frictional braking to occur when the starting operation detecting unit and the vehicle rollback detecting unit detect the vehicle rollback at starting, and the charging restriction unit detects a charging restriction.

According to the rollback prevention control device according to the present invention at starting, when a vehicle rollback occurs during starting operation, braking of wheels would be required to prevent this rollback, and the power source is restricted or limited to be charged, then a brake will be applied to the wheels by the frictional braking force.

Therefore, in case that the regenerative braking is not available due to restriction of charging, the frictional brake is operable to brake the wheels to prevent the rollback at starting operation. Thus, it is possible to prevent the rollback reliably at starting operation during the charging restriction period, thereby eliminating the above described problem.

According to the present invention, such situation may also be avoided in which the regenerative braking is carried out and the regenerative power overcharges the power source despite the charging limiting period.

BRIEF DESCRIPTION OF THE DRAWINGS

The description herein makes reference to the accompanying drawings wherein like reference numerals refer to like parts throughout the several views, and wherein:

FIG. 6 is a flowchart showing a subroutine related to the rollback determination process in the motor torque control program shown in FIG. 2.

FIG. 7 is a flowchart showing a subroutine related to the vehicle stop determination process in the motor torque control program shown in FIG. 2.

DETAILED DESCRIPTION

Description will be made of the embodiments according to the present invention below with reference to the accompanying drawings.

Figure 1:
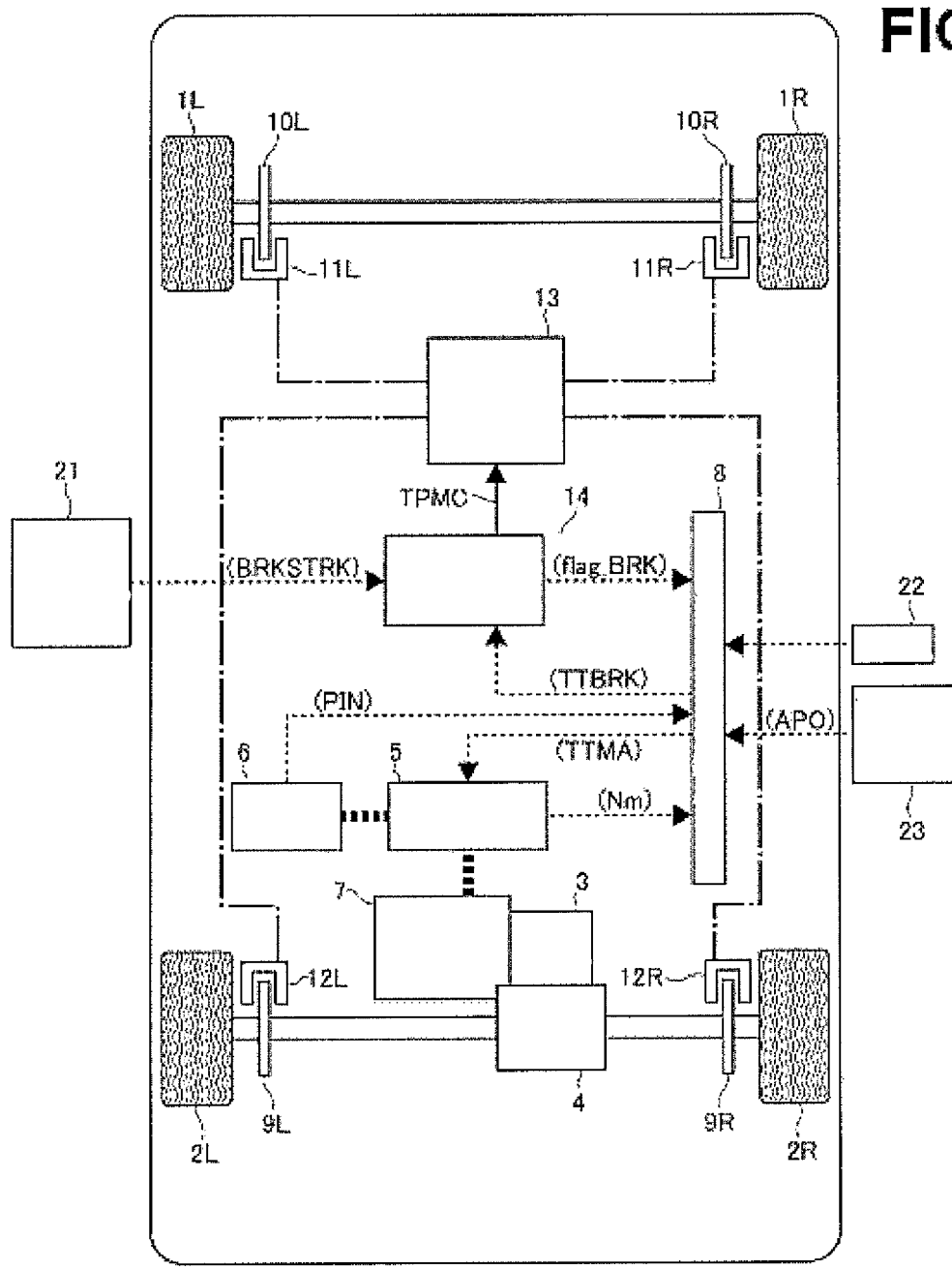
FIG. 1 is a system diagram schematically showing the vehicle brake-drive control system viewed from above the electrically driven vehicle that is equipped with rollback prevention control device at starting in the first embodiment of the present invention.

FIG. 1 is a system diagram schematically showing the vehicle brake-drive control system viewed from above the electrically driven vehicle that is equipped with rollback prevention control device at start up in the first embodiment of the present invention. In FIG. 1, 1L, 1R respectively denote left and right front wheels, while 2L, 2R left and right rear wheels.

The electrically driven vehicle shown in FIG. 1 is configured as an electric vehicle that can travel by driving left and right rear wheels 2L, 2R through a motor (motor/generator) as rotation electric machine via reduction unit 4 including a deferential gear mechanism When controlling the motor 3, and motor controller 5 is operable for DC to AC converting the power from battery 6(power source), supplying alternating power to motor 3 under control of inverter 7, and controls the motor 3 in such a way that the torque of motor 3 matches a motor torque command value TTMA from unified controller 8.

In the case that the motor torque command value TTMA from the unified controller 8 is of negative polarity requiring the action of regenerative braking to the motor 3, the motor controller 5 applies power generation associated load to the motor 3 without causing overcharge of battery 6. At this time, the power generated by motor 3 by this regenerative braking operation is AC to DC converted by inverter 7 for charging battery 6.

The electric vehicle shown in FIG. 1 is also capable of being braked by the frictional braking as described below, in addition to the above regenerative braking, and is installed with a composite brake composed of both the regenerative braking system and frictional braking system.

The frictional braking system is constructed by a well-known hydraulic disc brake device and outlined below.

This disk brake device comprises the brake disc 10L, 10R that rotate with the left and right front wheels 1L, 1R and brake disk 9L, 9R that rotate with left and right rear wheels 2L, 2R. These brake discs 10L, 10R, and 9L and 9R are each press-clamped from both sides in the axial direction so that left and right front wheels 1L, 1R and left and right rear wheels 2L, 2R may be individually controllable for frictional braking.

Brake unit 11L, 11R and 12L, 12R performs the operation described above by brake fluid pressure from the brake fluid pressure control device 13.

With respect to control of brake fluid pressure, hydraulic or fluid pressure brake controller 14 is made responsive to a signal from a brake pedal stroke sensor 21 for detecting a brake pedal stroke BRKSTRK and a later described brake torque command value TTBRK from the unified controller 8 for preventing rollback at starting up. The brake fluid pressure control device 13 is then operated in such a way that a brake fluid pressure command value (target master cylinder fluid pressure) TPMC to brake unit 11L, 11R, 12L and 12R is determined in order for the frictional braking torque of the overall vehicle to match the driver required brake torque in accordance with the brake pedal stroke BRKSTRK for the braking operation by brake pedal depression on the one hand, and to match the rollback prevention brake torque at start up TTBRK for the starting operation by accelerator depression on the other, and subsequently supplies thus determined brake fluid pressure command value (target mater cylinder fluid pressure) TPMC to brake unit 11L, 11R, 12L and 12R.

The integration or unified controller 8 is responsible for managing the energy consumption of the entire vehicle and to function to drive the vehicle at the maximum efficiency based on various input information not shown. For this purpose, the brake torque command value TTBRK for the above described fluid pressure brake controller 14 and motor torque command value TTMA (negative regenerative braking torque) to the motor controller 5.

The unified controller 8 and the fluid pressure brake controller 14 execute the motor torque control program in FIG. 2 and the brake fluid pressure control program in FIG. 3 respectively at the scheduled interrupt timing, i.e., every 10 msec, for example, and transmits and receives operation data to each other via communication to perform the rollback prevention control at start, which is described below and aimed by the present invention.

Thus, the unified controller 8 receives a battery chargeable power PIN determined based on the state of charge, a temperature, and the like of battery 6. It further receives a signal from shifter 22 that is operated by the driver when instructing the vehicle running mode (D range for forward travel, R range for reverse travel, and P, N ranges for parking, stopped operation) and a signal from an accelerator position or opening (AP0) sensor 23 representative of the accelerator depression amount or stroke).

On the other hand, the fluid pressure brake controller 14 receives a signal from the sensor 21 related to the stroke of the brake pedal.

The brake fluid pressure control program in FIG. 3 executed by the brake fluid pressure controller 14 first in step SB-01 performs to detect and calculate input parameters including the signal from sensor 21 related to the brake pedal stroke BRKSTRK In the following step SB-02, a brake depression determination flag (flag_BRK) is calculated by the process shown in FIG. 4.

When calculating the brake depression determination flag (flag_BRK), a check is made out as to whether or not the brake pedal stroke BRKSTRK is equal to or greater than a set value (10 mm in FIG. 4) that is set for determination of braking operation due to brake pedal depression.

When the brake pedal stroke BRKSTRK is determined to be equal to or greater than the set value (10 mm), a determination is made that the braking operation by the depression of the brake pedal is being performed, and in step S12, the brake depression determination flag (flag_BRK) is set to "1" to indicate that a braking operation is in progress.

However, when determining that the brake pedal stroke BRKSTRK is less than the set value (10 mm), a determination is made that the braking operation due to depression of brake pedal is not in place, and in step S12, the brake depression determination flag (flag_BRK) is reset to "0" to indicate that a braking operation is not in progress.

Figure 3:
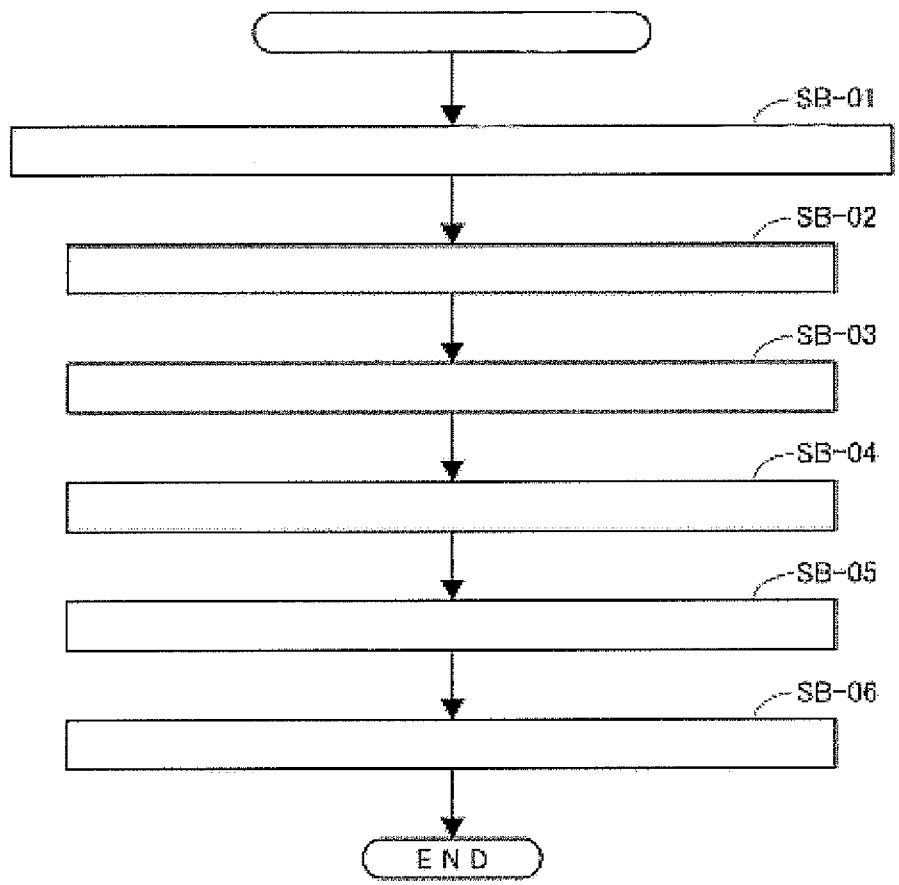
FIG. 3 is a flowchart for brake hydraulic or fluid pressure control program including rollback prevention brake pressure control at start up, that is executed by the unified controller in FIG. 1.
Figure 4:
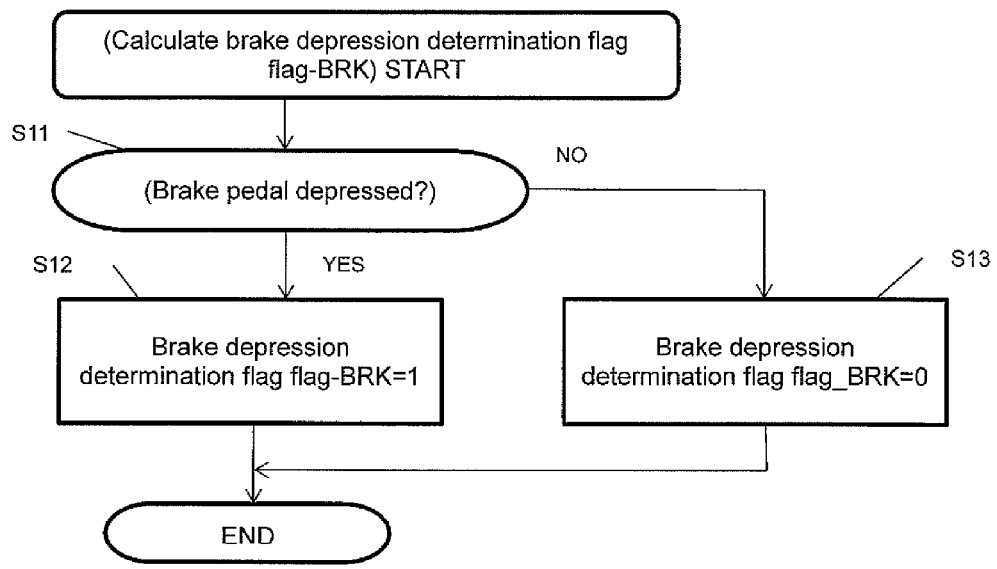
FIG. 4 is a flowchart showing a subroutine related to the brake depression determination process in the brake fluid pressure control program shown in FIG. 2.

In subsequent step SB-03 in FIG. 3, brake fluid pressure controller 14 performs a data transmission process to transmit the brake depression determination flag (flag_BRK) to the unified controller 8.

Figure 2:
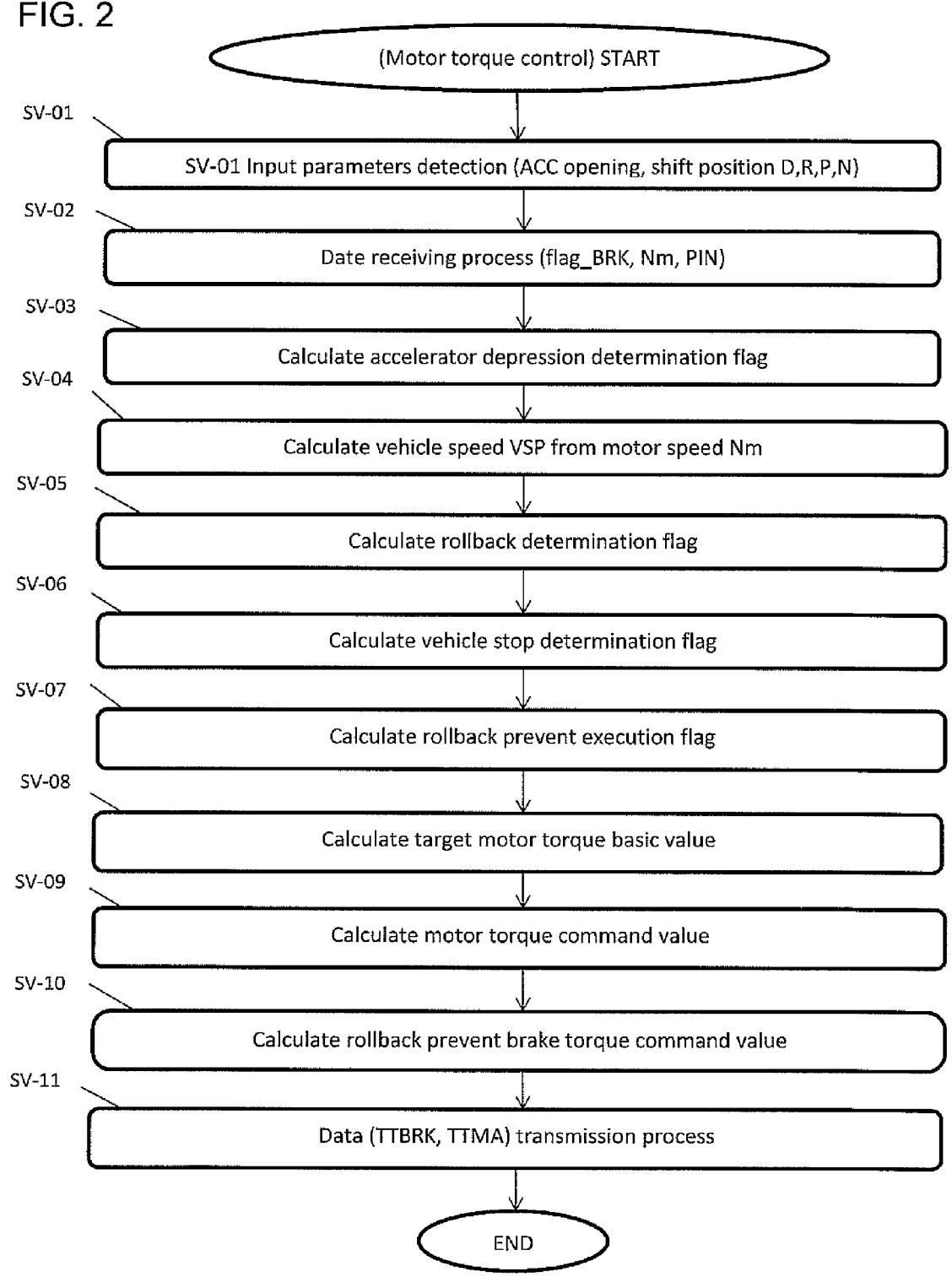
FIG. 2 is a flowchart for motor torque control program including the motor torque control for rollback prevention at start up, that is executed by a unified controller in FIG. 1.

In the motor torque control program in FIG. 2 executed by the unified controller 8, first in step SV-01, input parameters are detected to be input including a signal from sensor 23 representative of accelerator pedal position or opening (AP0) and a signal from shifter 23 representative of shift position (D, R, P, N range).

In the following step SV-02, the unified controller 8 performs a data reception processing and receives, in addition to the brake depression determination flag (flag_BRK) determined and transmitted by fluid pressure brake controller 14 in steps SB-02 in FIG. 3 as described above, information related to the rotation speed Nm of motor 3 transmitted from motor controller 5 shown in FIG. 1, and information related to the battery chargeable power (PIN) from battery 6.

In the following step SV-03, the unified controller 8 calculates an accelerator depression determination flag (flag_APO) in accordance with process shown in FIG. 5 that is now described below.

Figure 5:
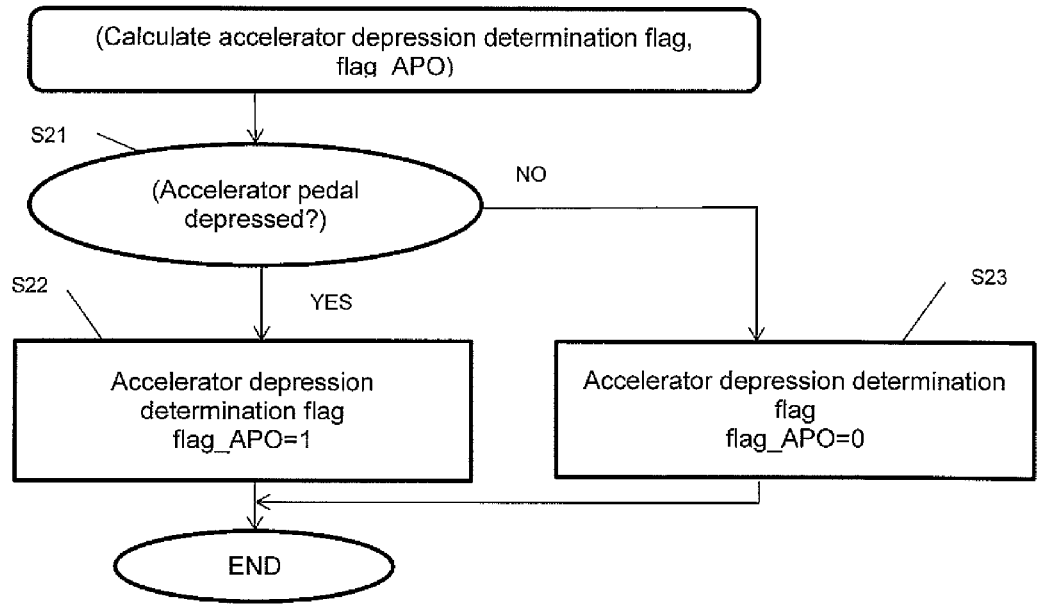
FIG. 5 is a flowchart showing a subroutine related to the accelerator depression determination process in the motor torque control program shown in FIG. 2.

In FIG. 5, in step S21, a check is made out to determine whether or not the accelerator opening APO is equal to or greater than a set value (5 deg in FIG. 5) for determination that an acceleration operation has been carried out including the starting operation due to accelerator pedal depression.

When the accelerator opening is determined to be equal to or greater than the set value (5 deg), then a determination is made that acceleration operation by depressing the accelerator pedal is in progress, and in step S22, an acceleration depression determination flag (flag_AP0) is set to "1" to indicate that the accelerator pedal is in a state of depression. However, when the accelerator opening APO is determined to be less than the set value (5 deg), thus determined not in a state of depression of the accelerator pedal, in step S23, the accelerator depression determination flag is reset to 0 (flag_APO) to indicate this state.

In the subsequent step SV-04 in FIG. 2, unified controller 8 calculates vehicle speed (VSP) based on the motor rotation speed Nm. In addition, the unified controller 8 determines by executing control program in FIG. 6 in step SV-05 (corresponding to rollback prevention detecting unit according to the present invention) whether or not the vehicle is in a rollback state in which the vehicle rolls back in a direction opposite to the starting direction at starting due to a road gradient and the like. Then, the unified controller 8, when determining that the vehicle is in rollback, sets a rollback determination flag to "1", and when not in a rollback state, the rollback determination flag (flag_ROLLBACK) will be reset to "0".

In other words, first in steps S31 and S32 in FIG. 6, a determination is made regarding a shift position, i.e. the driver has selected D range for forward travel, R range for reverse travel, and P or N range for non-driving state.

In step S33, if determined that the D-range is in place in step S31, a determination is made for the rollback state in which the vehicle rolls back in a direction opposite (i.e., rearwards) to the starting direction (i.e., forward starting due to D range) depending on whether or not a situation continues for a predetermined time (01. sec in FIG. 6) with the vehicle speed VSP being equal to or less than a rollback determination vehicle speed (−0.5 km/h FIG. 6).

When determined that the rollback state exists, in step S34, a rollback determination flag (flag_ROLLBACK) is set to "1" indicating this state, and when determined that the state is not in the rollback state, in step S35, the rollback determination flag (flag_ROLLBACK) is reset to "0" to indicate this fact.

In step S36, if determined that the R range is in place, in step S32, a determination is made for the rollback state in which the vehicle rolls back in a direction opposite (i.e., forward) to the starting direction (i.e., reverse starting due to R range) depending on whether or not a situation continues for a predetermined time (0.1. sec in FIG. 6) with the vehicle speed VSP being equal to or less than a rollback determination vehicle speed (0.5 km/h FIG. 6).

When determined that the rollback state exists, in step S37, a rollback determination flag (flag_ROLLBACK) is set to "1" indicating this state, and when determined that the state is not the rollback, in step S38, the rollback determination flag (flag_ROLLBACK) is reset to "0" to indicate this fact.

It should be noted that in steps S31 and step S32, if determined that the N range or the P range for the non-driving are in place, since it is unnecessary for determination of rollback because these ranges are not driving ranges for starting operation. In step S38, the rollback determination flag (flag_ROLLBACK) is reset to "0".

Next, the unified controller 8 determines whether or not the vehicle is in a stopped or stationary state (or starting state) with no rollback by carrying out the control program in FIG. 7 in step SV-06 (corresponding to stop state detection unit) in FIG. 3. When determined as a stopped state (or starting state) without a rollback, the vehicle stop determination flag (flag_VEL0) is set to "1", and when determined that the vehicle still rolls back without being stationary, the vehicle stop determination flag (flag_VEL0) is reset to "0" to indicate this fact.

That is, in step S42 and step S41 in FIG. 7, the shift position selected by the shifter 2 is determined by identifying D range for forward running, R range for reverse travel or the P or N range for the non-driving state.

In step S43, if determined as D range in step S41, depending on whether or not the situation lasts for a predetermined time (0.1 sec in FIG. 7) in which vehicle speed VSP is either "zero" (stopped) or positive (i.e., forward travel), a determination is made whether or not the vehicle is in a stopped state or starting state in the same direction as the starting direction (i.e., forward starting due to D range) after the vehicle has stopped to roll back.

When determined that the vehicle is in a stopped or starting state after the vehicle has stopped to rollback, in step S44, the vehicle stopping state determination flag (flag_VEL0) will be set to "1", while, when determined that the vehicle is not yet in a stopped or starting state, in step S45, the vehicle stopping determination flag (flag_VEL0) will be reset to "0" to indicate this event.

In step S43, if determined that the R range is in place in step S42, a determination is made, depending on whether or not the situation lasts for a predetermined time (0.1 sec in FIG. 7) in which vehicle speed VSP is either "zero" (stopped) or negative (i.e., reverse travel) after the vehicle has stopped to rollback, for the stopped state or starting state in which the vehicle moves in the same direction (i.e. rearward) as the starting direction (i.e., reverse starting due to R range).

When determined that the vehicle is in a stopped state or starting state after the vehicle has stopped to roll back, in step S48, the vehicle stopping determination flag (flag_VEL0) will be reset to "zero" to indicate this occurrence.

It should be noted that, when determined in steps S41 and S42 that the vehicle is either in P range or N range for non-travel, since these are not the running or driving ranges for starting, the above described vehicle stop determination is unnecessary and the vehicle stopping determination flag (flag_VEL0) will be reset to "0" in step S48.

Figure 8:
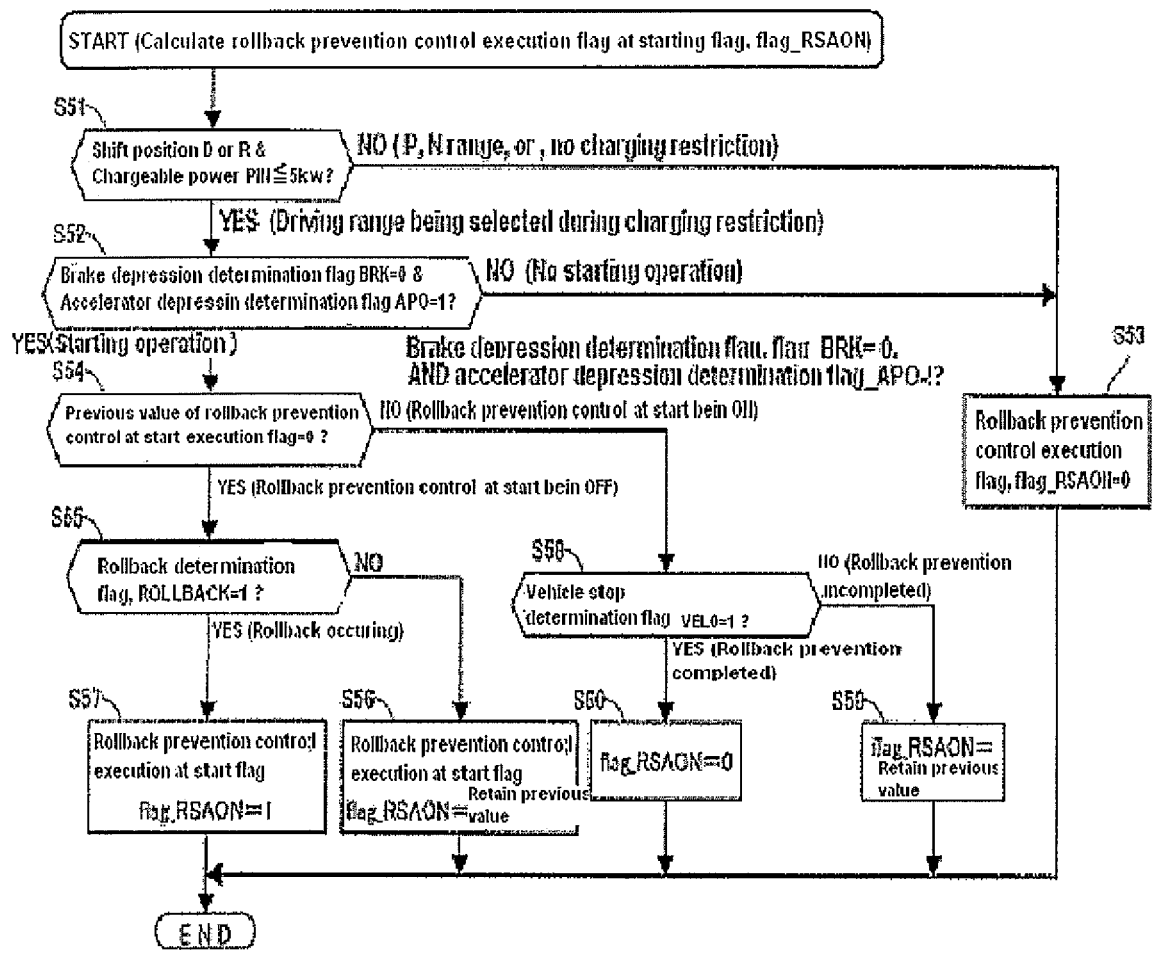
FIG. 8 is a flowchart showing a subroutine related to determination process on execution of rollback prevention control at starting in the motor torque control program in FIG. 2.

Then, the unified controller 8 determines whether or not to perform the rollback prevention control aimed at by the present invention by executing the control program of FIG. 8 in step SV-07 in FIG. 3.

When determined to perform the rollback prevention control at starting because of their conditions for execution being satisfied, a rollback prevention control execution flag (flag_RSAON) will be set to "1" to indicate this event.

When determined not to perform the rollback prevention control at starting because of their conditions for execution being not yet satisfied, a rollback prevention control execution flag (flag_RSAON) will be reset to "0" to indicate this event.

More specifically, in step S51 in FIG. 8, a check is made out that the shift position selected by the shifter 2 is the travel range, i.e., D range or R range, and battery 6 is in a charging restriction period in which the chargeable power PIN is equal to or less than 5 kW.

In step S52, following step S51 in which a travel range has been selected during the charging restriction period, a check is made out for the existence of starting operation depending on that the brake depression determination flag (flag_BRK) is "zero" (non-braking state with brake pedal not being depressed) and that the accelerator depression determination flag (flag_AP0) is "1" (i.e. acceleration state with accelerator pedal being depressed). Therefore, step S52 corresponds to the starting operation detection means.

In step S51, when a determination is made of non-travel range of P or N range, or the chargeable power PIN of battery 6 exceeds 5 kW and not in the charging restriction period, then the rollback prevention control at starting according to the present invention is held necessary, and the rollback prevention control execution flag (flag_RSAON) will be reset to "zero".

Further, even if a determination is made for selection of D, R range (travel range) during the charging restriction period in step S51, with a braking state (flag_BRK=1) by brake pedal depression or a non-acceleration state (flag_AP0=0) with accelerator pedal being not depressed, no intention of acceleration (starting operation) is clearly confirmed. Therefore, the rollback prevention control in terms of the purpose of the present invention is obviously unnecessary. The rollback prevention control execution flag (flag_RSAON) will thus be reset to "0" to indicate this occurrence.

When the travel range has been determined to be selected during the charging restriction period in step S51, (flag_BRK) is "0" in step S52 (non-braking state in which brake pedal is not being depressed), and (flag_AP0) is "1" (accelerator pedal is depressed), i.e., when the starting operation is determined to exist, a check is made out in step S54 whether or not the rollback prevention control at starting up is in place depending on the previous rollback prevention control execution flag at starting (flag_RSAPN) is "0" or not.

When the rollback prevention control is in non-execution state (OFF), in step S55 a check is made out in step S55 whether or not the vehicle gives rise to rollback depending on whether the rollback determination flag (flag_ROLLBACK) is "1" or not. Thus, step S55 corresponds to the vehicle rollback detection unit according to the present invention.

When (flag_ROLLBACK) is determined as "0" (rollback at starting is not occurring), since there is no need for rollback prevention control at starting, the rollback prevention control execution flag (flag_RSAON) remains "0" in step S55, the same as the previous value checked in step S54.

When (flag_ROLLBACK) is determined "1" (rollback at starting is occurring), since there is need for rollback prevention control at starting, the rollback prevention control execution flag (flag_RSAON) will be set "1" in step S57.

When the previous value of the rollback prevention control execution flag at starting (flag_RSAON) is determined to be "1", i.e., when the rollback prevention control is determined to be executed (ON), a check is made out in step S58 whether or not the vehicle is in a stopped state (or in starting state) after completion of rollback prevention depending on whether the vehicle stopping determination flag (flag_VEL0) is "1" or not.

Hence, step S58 corresponds to the vehicle stopping detection means according to the present invention.

While the vehicle stopping determination flag (flag_VEL0) is determined not to be "1", i.e., the vehicle rollback prevention control at starting has not yet been completed, and thus rollback is occurring, the rollback prevention control execution flag (flag_RSAON) is maintained at "1", the previous value checked in step S54.

When it is determined that the vehicle stopping determination flag (flag_VEL0) is "1" in step S58, i.e., when the rollback does not occur after completion of rollback prevention control, i.e., the vehicle is in a stopped (or starting state), the rollback prevention control execution flag (flag_RSAON) is reset to "0" in step S60.

Figure 9:
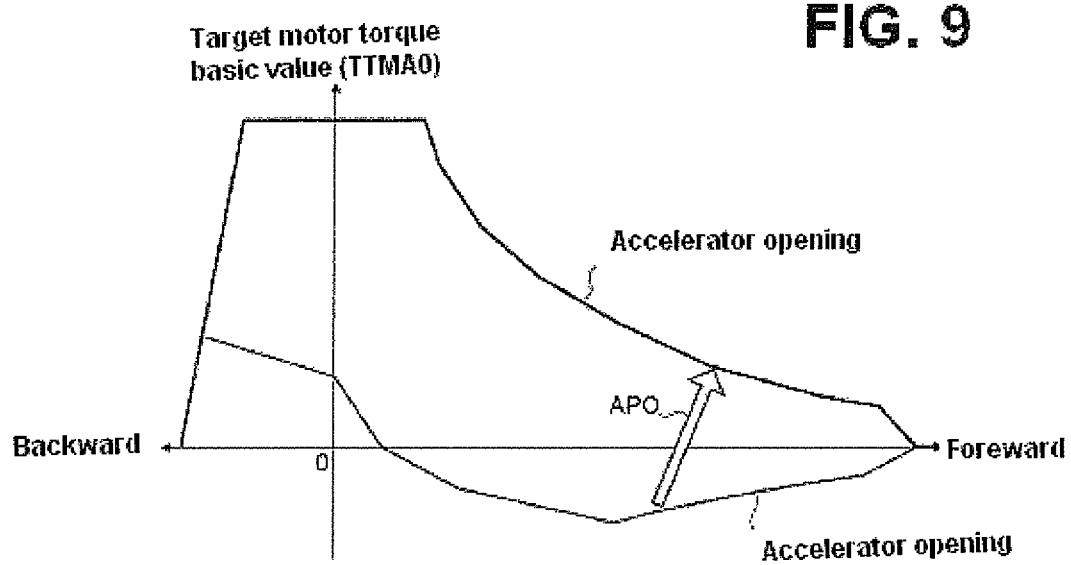
FIG. 9 is a characteristic diagram showing the variation characteristic of the target motor torque basic value using vehicle speed and accelerator pedal position as parameters.

In step SV-08, the unified controller 8 calculates a target motor torque basic value TTMA0 that is required by the driver under the current operating conditions from accelerator opening AP0 and vehicle speed VSP based on a target motor torque basic value map illustrated in FIG. 9.

The unified controller 8 calculates the motor torque command value (TTMA) to instruct to motor controller 5 as shown in FIG. 1 in the following step SV-09 (corresponding to rotation electric machine control unit and starting preparation unit).

In other words, when the rollback prevention control execution flag (flag_RSAON) is "0", the motor torque command value (TTMA) is set as the same value of the above target motor torque basic value (TTMA0), i.e., (TTMA=TTMA0), where a normal motor torque control is performed.

When the rollback prevention control execution flag (flag_RSAON) is switched from "0" to "1", the motor torque command value (TTMA) is set to approach "0" at a constant rate starting from the value at the time of switching (the same value as the target motor torque basic value TTMA0). In contrast, when the rollback prevention control execution flag (flag_RSAON) is switched from "1" to "0", the motor torque command value (TTMA) will be recovered or returned to the target motor torque basic value TTMA0 at a constant rate of change from "0" at the timing of switching, and control returns to a normal motor torque control at the completion timing of recovery at which TTMA is equal to TTMA0.

The unified controller 8 calculates the rollback prevention brake torque command value (TTBRK) to be instructed to fluid pressure brake controller 14 in FIG. 1 in step SV-10 in FIG. 2 (corresponding to the frictional braking control unit and frictional braking force recovery unit) in the following manner.

More specifically, when the rollback prevention control execution flag (flag_RSAON) is "0", since the rollback prevention control at starting is not executed, the rollback prevention brake torque command value (TTBRK) will be set to "0" (i.e., TTBRK="0").

When the rollback prevention control execution flag at starting (flag_RSAON) switches from "0" to "1", the rollback prevention braking torque command value (TTBRK) will be increased to attain the same torque value as the target motor torque basic value TTMA0 from "0" at the timing of switching at a constant rate of change.

Conversely, when the rollback prevention control execution flag at starting (flag_RSAON) is switched from "1" to "0", the rollback prevention braking torque command value (TTBRK) will be reduced from the value at the timing of switching (the same torque value as the target motor torque basic value TTMA0) to finally reach "0" (i.e., TTBRK="0").

Note that, in the embodiment, the reduction rate of the rollback prevention control braking torque command value (TTBRK) at starting during the reduction is set as the same as the increase rate in motor torque command value (TTMA) from "0" to the target motor torque basic value TTMA0, which is performed in step SV-09 in response to change of (flag_RSAON) being from "1" to "0".

The unified controller 8 performs a data transmission process in which the rollback prevention braking torque command value (TTBRK) obtained in step SV-10 will be transmitted to fluid pressure brake controller 14 shown in FIG. 1 while the motor torque command value (TTMA) obtained in step SV-09 will be transmitted to motor controller 5 shown in FIG. 1.

Figure 10:
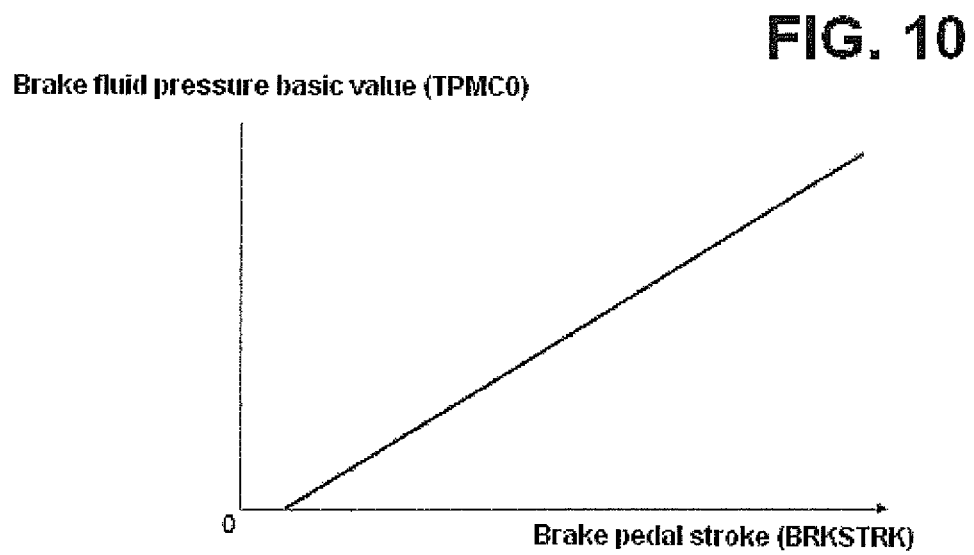
FIG. 10 is a characteristic diagram showing change in the characteristics of the brake fluid pressure basic value with respect to brake pedal stroke.

In step SB-04 in FIG. 3, the fluid pressure brake controller 14 calculates a brake fluid pressure basic value (TPMC0) corresponding to the brake torque the driver is requesting, based on the brake pedal stroke BRKSTRK with reference to a map corresponding to a brake fluid pressure characteristic shown in FIG. 10.

In the subsequent step SB-05, the fluid brake controller 14 performs a data receiving process in FIG. 1 to receive the rollback prevention brake torque command value (TTBRK) at starting transmitted from unified controller 8 in step SV-11 in FIG. 2.

Subsequently, the fluid brake controller 14 calculates a brake fluid or hydraulic pressure command value (TPMC) to be transmitted to brake fluid pressure control device 13 shown in FIG. 1 in step SB-06 in FIG. 3 that corresponds to the frictional braking control unit according to the present invention.

This brake fluid pressure command value (TPMC) is a brake fluid pressure command value (target master cylinder fluid pressure) to operate brake unit 11L, 11R, 12L, and 12R such that the frictional brake torque of the overall vehicle corresponds to the brake torque of driver request corresponding to brake pedal stroke BRKSTRK at braking operation in response to brake pedal depression on the one hand, and corresponds to the rollback prevention brake torque command value TTBRK at starting in response to the accelerator pedal depression.

Therefore, the brake fluid pressure command value (TPMC) determines to take the higher one of and select higher between brake fluid pressure basic value TPMC0 obtained in step SB-04 and the rollback prevention brake fluid pressure required to achieve the rollback prevention brake torque command value at starting TTBRK received in step SB-05.

The operation of the rollback prevention control device in the above described first embodiment is now explained below with reference to the starting operation shown in FIG. 11 in which accelerator pedal opening AP0 increases as illustrated from instant t1 in a stationary or stopped state (vehicle speed VSP=0) with D range operation under charging restriction operation.

In response to the starting operation due to increase in the accelerator opening AP0, the target motor torque basic value TTMA0 increases as shown by a broken line.

Since the rollback prevention control execution flag flag_RSAON is "0" at initial starting period, and thus the rollback prevention control is not executed, the motor torque command value TTMA will be set to the same value as the target motor torque basic value TTMA0.

By the way, when the vehicle rolls back in a direction opposite to the starting direction due to road gradient despite the motor torque command value TTMA (=TTMA0) and the state lasts for a predetermined time 0.1 sec or more in which the vehicle speed VSP is equal to or below a rollback determination speed, 0.5 km/h (step S33, FIG. 6), the rollback determination flag flag_ROLLBACK switches from "0" to "1" at this instant t2 (step S34, FIG. 6). Thus, at starting, the rollback prevention control execution flag, flag_RSAON switches from "0" to "1" (step S57, FIG. 8) and the rollback prevention control will be performed below.

At instant t2 when the rollback prevention control execution flag (flag_RSAON) switches from "0" to "1", the rollback prevention brake torque command value (TTBRK) increases from the instant t2 of switching at "0" with a constant rate of change $\alpha1$ to attain the same torque value with the target motor torque basic value TTMA0 (step SV-10, FIG. 2).

Then, in response to the increase in the rollback prevention torque command value (TTBRK) at starting, the rollback prevention brake fluid pressure also increases to achieve this.

By the way, as described above for step SB-06 in FIG. 3, the brake fluid pressure command value TPMC toward the brake hydraulic pressure control device 13 in FIG. 1, is derived from a higher value between the rollback prevention brake fluid pressure at starting and the brake fluid pressure basic value TPMC0 obtained in step SB-04 (i.e., by selecting higher value) in order to achieve the rollback prevention brake torque command value (TTBRK).

However, at starting operation, since the stroke BRKSTRK is "0" due to release of brake pedal, the brake fluid pressure basic value TPMC0 is also "0".

Figure 11:
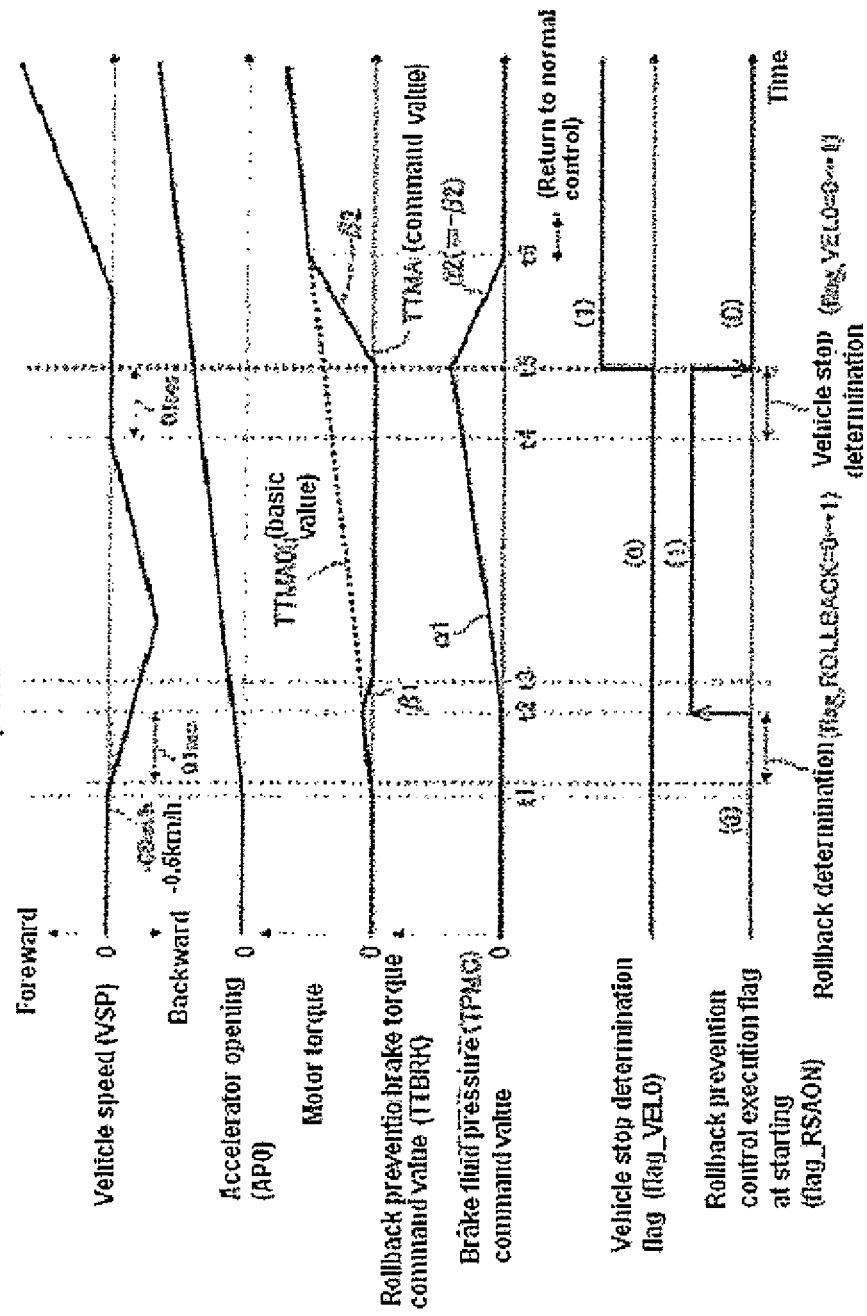
FIG. 11 is a time chart of the controller operation at start up for rollback prevention control device in the first embodiment shown in FIGS. 1 to 10.

Therefore, the brake fluid pressure command value TPMC assumes the same value as the rollback prevention brake fluid pressure at starting and increases as shown in FIG. 11 (in FIG. 11, for convenience, shown as the same line as the rollback prevention brake torque command value TTBRK).

On the other hand, after instant t2 at which the rollback prevention control execution flag (flag_RSAON) switches from "0" to "1", the motor torque command value (TTMA) is decreased from the value at initial switching instant t2 (the same value as the target motor torque basic value TTMA0) with a constant rate of change $\beta1$ to finally attain "0" at instant t3 (step SV-09, FIG. 2).

Due to reduction in the motor torque command value (TTMA) after instant t2 with maintained "0" after instant t3, and the increase in the above described rollback prevention brake torque command value TTBRK (brake fluid pressure command value TPMC) at starting, the rollback will be prevented as apparent from the development over time of the vehicle speed VSP.

At instant t4 in FIG. 11 at which the vehicle rollback prevention has completed with the vehicle speed VSP being "0", the vehicle stop determination is made (step S43, FIG. 7) depending on this state has continued for a predetermined time 0.1 sec or not. At instant t5 at which the state of vehicle speed being "0" has lasted for 0.1 sec, the vehicle stop determination flag flag_VEL0 is switched from "0" to "1" (step S44, FIG. 7).

In response to the switching of the vehicle stop determination flag, flag_VEL0 from 0 to 1, at instant t5 the rollback prevention control execution flag at starting (flag_RSAON) will be switched from "1" to "0" (step S58 and step S60 in FIG. 8).

When at instant t5 the rollback prevention control execution flag (flag_RSAON) has switched from "1" to "0", the motor torque command value (TTMA) returns to the target motor torque basic value TTMA0 (step SV-09) from "0" at the time of switching, at instant t5 with a constant rate of change β2, and control returns to the normal motor torque control at instant t6 at the completion of recovery (with TTBRK "0") (step SV-9, FIG. 2).

After instant t5 at which the rollback prevention control execution flag (flag_RSAON) has switched from "1" to "0", the rollback prevention brake torque command value (TTBRK) at starting will decrease from the value at instant t5 of switching (i.e., the same value as the target motor torque basic value TTMA0) with a constant rate of change α2 (the same speed with the motor torque increase speed β2) to finally attain "0" at instant t6 (step SV-10, FIG. 2).

In addition, along with reduction of the rollback prevention brake torque command value (TTBRK), brake fluid pressure command value (TPMC) is also reduced (step SB-06, FIG. 3).

Due to decrease or reduction in rollback prevention brake torque command value TTBRK (brake fluid pressure command value TPMC) at α2 along with the recovery of the above described motor torque command value (TTMA) to the target motor torque basic value TTMA0 at β2, the vehicle is able to start as apparent from the vehicle speed is equal to or greater than zero (i.e., VSP≥0).

Further, considering that the decrease or reduction rate of rollback prevention brake torque command value TTBRK (brake fluid pressure command value TPMC) at α2 and the recovery of the above described motor torque command value (TTMA) to the target motor torque basic value TTMA0 at β2 are the same (i.e., α2=β2), the two operations complete at the same instant t6, and both motor torque control and brake control may be returned to normal control mode at this instant t6 and thereafter.

Incidentally, in the first embodiment, when the rollback of vehicle occurs at starting operation and braking of wheels are required to prevent the rollback with battery 6 being restricted for charging, the wheels are controlled to be braked with friction based on the rollback prevention brake torque command value TTBRK (brake fluid pressure command value TPMC) at starting.

Therefore, when the regenerative braking will not be available, wheels are braked by the friction brake (TTBRK) to prevent rollback at startup. Thus, the disadvantageous situation may be avoided in which the rollback at starting operation may not be prevented during the charging restriction period.

Additionally, such situation may also be avoided in which the regenerative braking is performed despite the period of restriction of charging and the regenerative power causes to overcharge battery 6.

In addition, the motor torque command value (TTMA) is set to "0" while wheels are being braked with friction based on the rollback prevention brake torque command value TTBRK (brake fluid command value TPMC). Thus, no regenerative torque (TTMA) will be output by motor 3 at motor torque command value (TTMA=TTMA0) responsive to accelerator opening AP0 despite the rollback preventive operation by way of frictional braking so that overcharging may be avoided reliably.

In addition, in response to the vehicle stop determination flag, flag_VEL0 being set to "1", the vehicle stopped state is determined at the vehicle rollback prevention by the frictional barking of wheels based on the rollback prevention brake torque command value TTBRK (brake fluid pressure command value TPMC). Then, braking of wheels with friction based on the rollback prevention brake torque command value TTBRK at starting (brake fluid pressure command value TPMC) will be prevented, and the motor torque command value (TTA) will be allowed to return from "0" to the target motor torque basic value TTMA0.

Therefore, there is no such an occurrence of situation where regenerative braking will start without the vehicle rollback being stopped. Thus, a disadvantageous situation may be avoided in which the regenerative power occurs in spite of the charging restriction period.

Further, since the rollback prevention brake torque command value at starting, TTBRK is set to the value equivalent to the target motor torque basic value TTMA0 in accordance with the accelerator opening AP0, the change in increase or decrease in the wheel frictional braking force based on the rollback prevention brake torque command value TTBRK (brake fluid pressure command value TPMC) is made in accordance with the acceleration opening by the driver. Thus, the frictional braking force control is assured with the same feel as the rollback prevention control at starting by regenerative braking so that the rollback prevention control may be realized without causing a feeling of discomfort.

In addition, at the instance at which the rollback prevention at starting has completed with the vehicle stopping, the reduction in rollback prevention brake torque command value TTBRK at starting (brake fluid pressure command value TPMC) (at speed α2) and the recovery of the motor torque basic value (TTMA) to the target motor torque command value TTMA0 (at speed β2) are performed at the same speed. Thus, both the former reduction in rollback prevention brake torque command value TTBRK at starting (brake fluid pressure command value TPMC) and the latter recovery of the motor torque basic value (TTMA) to the target motor torque command value TTMA0 are completed at the same instant (instant t6, FIG. 11) to revert to the normal control.

Thus, such a disadvantageous situation may be avoided in which a smooth starting is not guaranteed due to a difference in completion timing of the two with a sense of sticking braking accompanied.

Further, when the starting operation is released by the release of the accelerator pedal during the control for preventing rollback of the vehicle by braking with the friction on the wheels based on the rollback prevention brake torque command value TTBRK (brake fluid pressure command value TPMC), control advances from step S52 in FIG. 8 to step S53 where the rollback prevention control execution flag, flag_RSAON at starting will be set to "0". Thus, the rollback prevention control by frictional braking will be stopped (by setting TTBRK to "0"), and the brake fluid pressure command value TPMC obtained in step SB-06 in FIG. 3 will be set to the same value as the brake fluid pressure basic value TPMC0 obtained in step SB-04 in the same figure.

Therefore, even when depressing the brake pedal and stopping the starting operation during the control of the vehicle rollback prevention, since the brake fluid pressure command value TPMC is set in accordance with the brake pedal stroke BRKSTRK (driver's braking operation), there is no risk of giving rise to feel of discomfort so that recovery or return to the normal control may be performed without discomfort.

Figure 12:
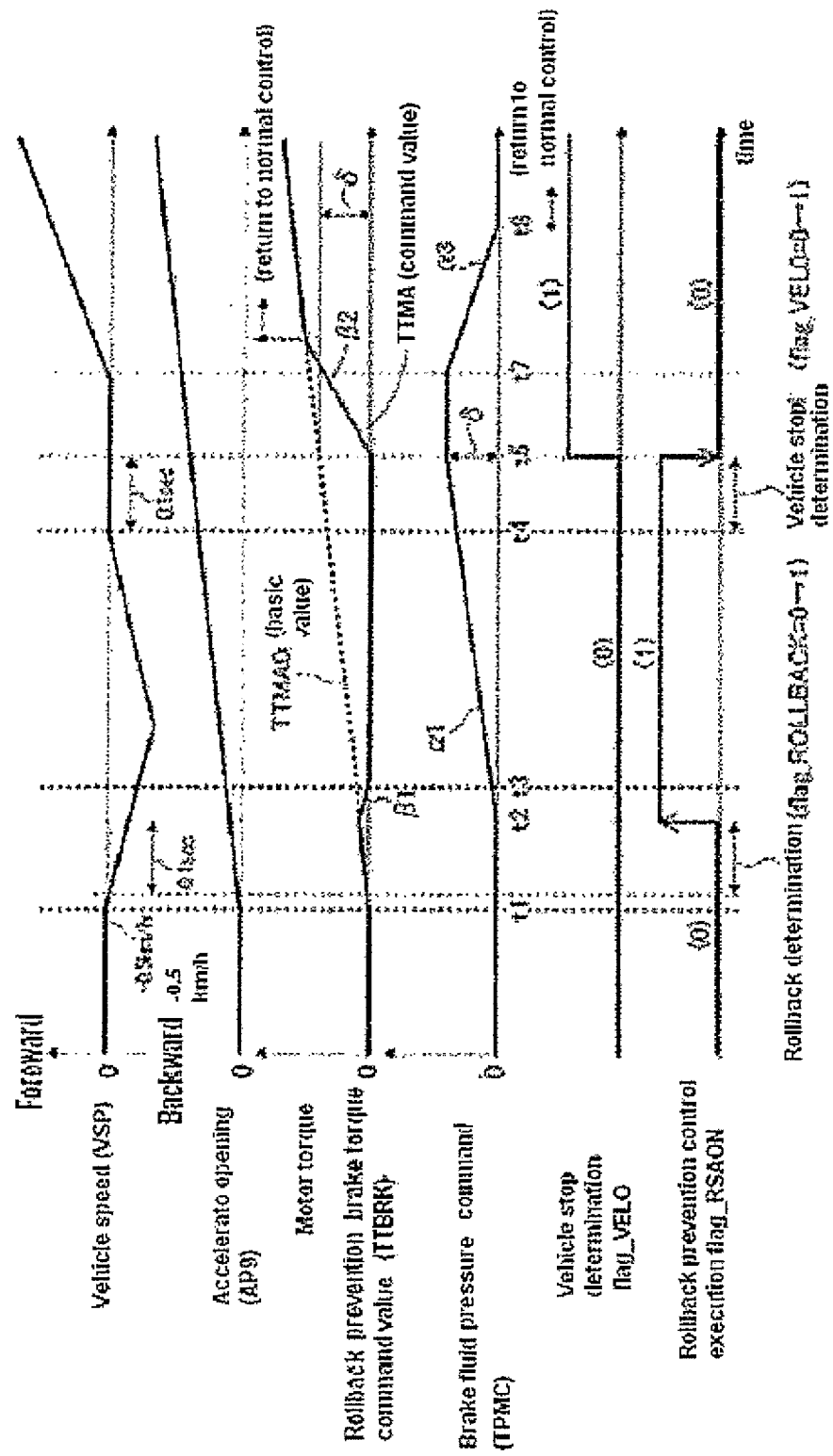
FIG. 12 is a time chart of the controller operation at start up for rollback prevention control device in the second embodiment, when operated in the same conditions as FIG. 11.

FIG. 12 is a time chart of the operation at startup for rollback prevention control in the second embodiment according to the present invention.

In this embodiment, the manner of reduction with which the rollback prevention brake torque command value (TTBRK) at starting will be reduced at the instant at which the rollback prevention control execution flag (flag_RSAON) has changed from "1" to "0" is performed as described below referring to FIG. 12 while otherwise in the same manner as in the first embodiment.

FIG. 12 shows the operation time chart in the same condition as in FIG. 11, and the motor torque command value TTMA increases as in the first embodiment from instant t5 at which the rollback prevention control execution flag (flag_RSAON) switches from "1" to "0" toward the target motor torque basic value TTMA0 from "0" at a rate of change β2 (step SV-09, FIG. 2).

The rollback prevention brake torque command value (TTBRK) at starting will be allowed to be reduced in step SV-10 in FIG. 2 to reach "0" finally from the value δ (same value as the motor torque basic value TTMA0) as described below.

In other words, instant t7 is made as a reference at which the motor torque command value TTMA increases from "0" towards the target motor torque TTMA0 at a rate of change β2 to attain the same value δ as the rollback prevention brake torque command value (TTBRK) at starting assumes at the timing of the above described switch.

Until the instant t7, the rollback prevention brake torque command value (TTBRK) at starting is maintained at the value δ at instant t5, and at and after the instant t7, the rollback prevention brake torque command value (TTBRK) will be allowed to be reduced from the maintained value δ to "0" (i.e. TTBRK="0") at instant t8 with a constant rate of change α3 and subsequently control returns to a normal control.

In addition, the timing to allow the rollback prevention brake torque command value (TTBRK) to return from the maintained value δ toward "0" is not required, as described above, to be the instant t7 of the same value δ at which the motor torque command value TTMA assumes at instant t5.

For example, the rollback prevention brake torque command value (TTBRK) may be allowed to return from the maintained value δ to "0" at the timing at which the motor torque command value TTMA reaches a predetermined percentage of the above described value, δ.

In the rollback prevention control device in the second embodiment, the rollback prevention brake torque command value (TTBRK) is not allowed to start to decrease immediately at instant t5 at which the rollback prevention control execution flag (flag_RSAON) has switched from "1" to "0".

Instead, the rollback prevention brake torque command value (TTBRK) is maintained for a predetermined time (until instant t7 in FIG. 12) at the value δ at instant t5, and thereafter is decreased toward "0". Therefore, the vehicle rollback prevention may be performed reliably by frictional braking, and such a disadvantage is surely avoided where regenerative power occurs despite the charging restriction period.

In addition, description has been made in the case of the illustrated embodiments that an electrically driven vehicle is, as shown in FIG. 1, an electric vehicle that is equipped with only the electric motor 3 as a power source. The same concept may be applied with the similar idea to a hybrid vehicle propelled by energy from both engine and electric motor. It goes without saying that the same operation, as well as the effects, is achieved as the above described operation and effects.

The invention claimed is:

1. A rollback prevention control device for an electrically driven vehicle capable of traveling by transmitting driving force from a rotation electric machine to wheels with the wheels being braked by regenerative braking by a load associated with electric generation of the rotation electric machine and a frictional braking on an as required basis, comprising:
   a charging restriction detecting unit that detects that charging to the rotation electric machine is being prohibited;
   an accelerator operation detecting unit that detects an accelerator operation of a driver of the electrically driven vehicle;
   a vehicle rollback detecting unit that detects if the vehicle rolls back in a direction opposite to a starting direction when the accelerator operation detecting unit has detected the accelerator operation; and
   a frictional braking control unit that causes the frictional braking to occur and to control a frictional braking force to a braking force in accordance with the accelerator operation when the accelerator operation detecting unit and the vehicle rollback detecting unit detect the vehicle rollback at the accelerator operation and the charging restriction unit detects prohibition of a charging operation.

2. The rollback prevention control device for an electrically driven vehicle as claimed in claim 1, further comprising:
   a rotation electric machine control unit that controls an output of the rotation electric machine to zero while the frictional braking control unit causes the frictional braking to occur.

3. The rollback prevention control device for an electrically driven vehicle as claimed in claim 2, further comprising:
   a vehicle stop detecting unit that detects a vehicle stopped state after the vehicle has stopped roll back; and
   a starting preparation unit that stops the frictional braking by the frictional braking control unit upon detection of the vehicle stopped state by the vehicle stop detecting unit and returns an output torque of the rotation electric machine whose output has been controlled to zero to a target output torque value in accordance with the accelerator operation.

4. The rollback prevention control device for an electrically driven vehicle as claimed in claim 3, wherein the frictional braking force that the frictional braking control unit causes to occur is equal to a torque value equivalent to the target output torque of the rotation electric machine in response to the accelerator operation.

5. The rollback prevention control device for an electrically driven vehicle as claimed in claim 3, wherein the starting preparation unit is configured to match a braking force reduction rate when the frictional braking control unit stops the frictional braking to occur to a recovery speed of the output of the rotation electric machine from zero to the target output torque.

6. The rollback prevention control device for an electrically driven vehicle as claimed in claim 3, wherein the starting preparation unit is configured, during reduction in the braking force when the frictional braking control unit stops the frictional braking, with respect to an instant at which the output torque of the rotation electric machine during recovery from "zero" attains the torque value equivalent to the frictional braking force at a starting time of that reduction, to hold the frictional braking force at a same torque value as the frictional braking force at the starting time of that reduction prior to that instant while to control to decrease the frictional braking force from that instant.

7. The rollback prevention control device for an electrically driven vehicle as claimed in claim 1, further comprising:
   a frictional braking force recovery unit that is configured, when the accelerator operation detecting unit does not detect the accelerator operation by the driver, to stop the frictional braking and control the frictional braking force to a torque value corresponding to a braking operation by the driver.

* * * * *